(12) United States Patent
Buse et al.

(10) Patent No.: US 8,578,968 B2
(45) Date of Patent: Nov. 12, 2013

(54) ELECTRICAL SWITCHING VALVE

(75) Inventors: Werner Buse, Kaarst (DE); Albert Denne, Meerbusch (DE)

(73) Assignee: Pierburg GmbH, Neuss (DE)

(*) Notice: Subject to any disclaimer, the term of this patent is extended or adjusted under 35 U.S.C. 154(b) by 407 days.

(21) Appl. No.: 12/936,911

(22) PCT Filed: Feb. 4, 2009

(86) PCT No.: PCT/EP2009/051232
§ 371 (c)(1),
(2), (4) Date: Oct. 8, 2010

(87) PCT Pub. No.: WO2009/127450
PCT Pub. Date: Oct. 22, 2009

(65) Prior Publication Data
US 2011/0024656 A1 Feb. 3, 2011

(30) Foreign Application Priority Data
Apr. 17, 2008 (DE) .......... 10 2008 019 209

(51) Int. Cl.
*F16K 31/06* (2006.01)
(52) U.S. Cl.
USPC .................................. 137/625.65
(58) Field of Classification Search
USPC ............ 137/625.65, 907; 251/30.01
See application file for complete search history.

(56) References Cited

U.S. PATENT DOCUMENTS

| | | | | |
|---|---|---|---|---|
| 3,921,670 A | * | 11/1975 | Clippard et al. | 137/625.65 |
| 4,005,733 A | * | 2/1977 | Riddel | 137/625.65 |
| 4,205,593 A | * | 6/1980 | Sakakibara | 137/625.65 |
| 4,322,057 A | * | 3/1982 | Yamanaka et al. | 137/625.65 |
| 4,326,696 A | | 4/1982 | Ishikawa et al. | |
| 4,501,299 A | | 2/1985 | Klimowicz et al. | |
| 4,559,971 A | * | 12/1985 | Bradshaw | 137/596.17 |
| 4,669,361 A | * | 6/1987 | Ito et al. | 137/907 |
| 5,503,185 A | | 4/1996 | Krause | |
| 5,651,528 A | | 7/1997 | Frei et al. | |
| 5,934,642 A | * | 8/1999 | Pearson et al. | 251/61 |

FOREIGN PATENT DOCUMENTS

| | | |
|---|---|---|
| DE | 32 01 071 A1 | 7/1983 |
| DE | 43 42 566 A1 | 6/1995 |
| DE | 44 02 523 A1 | 8/1995 |
| DE | 195 16 442 A1 | 11/1995 |
| DE | 4 419 875 A1 | 12/1995 |
| EP | 0 095 331 A1 | 11/1983 |
| EP | 0 633 415 A1 | 1/1995 |
| EP | 0 919 755 A1 | 6/1999 |

* cited by examiner

*Primary Examiner* — Eric Keasel
(74) *Attorney, Agent, or Firm* — Norman B. Thot

(57) ABSTRACT

An electric switching valve for controlling a pneumatic actuator element includes a housing with a ventilation connection channel, a vacuum connection channel and a consumer connection channel. The vacuum connection channel comprises a first valve seat and the ventilation connection channel comprises a second valve seat. An electromagnetic drive is arranged in the housing. The electromagnetic drive is configured so that a magnetic armature is translationally movable in a passage channel to form a valve closure body for each of the vacuum connection channel and the ventilation connection channel. A cross-sectional constriction device is disposed in the ventilation connection channel.

5 Claims, 1 Drawing Sheet

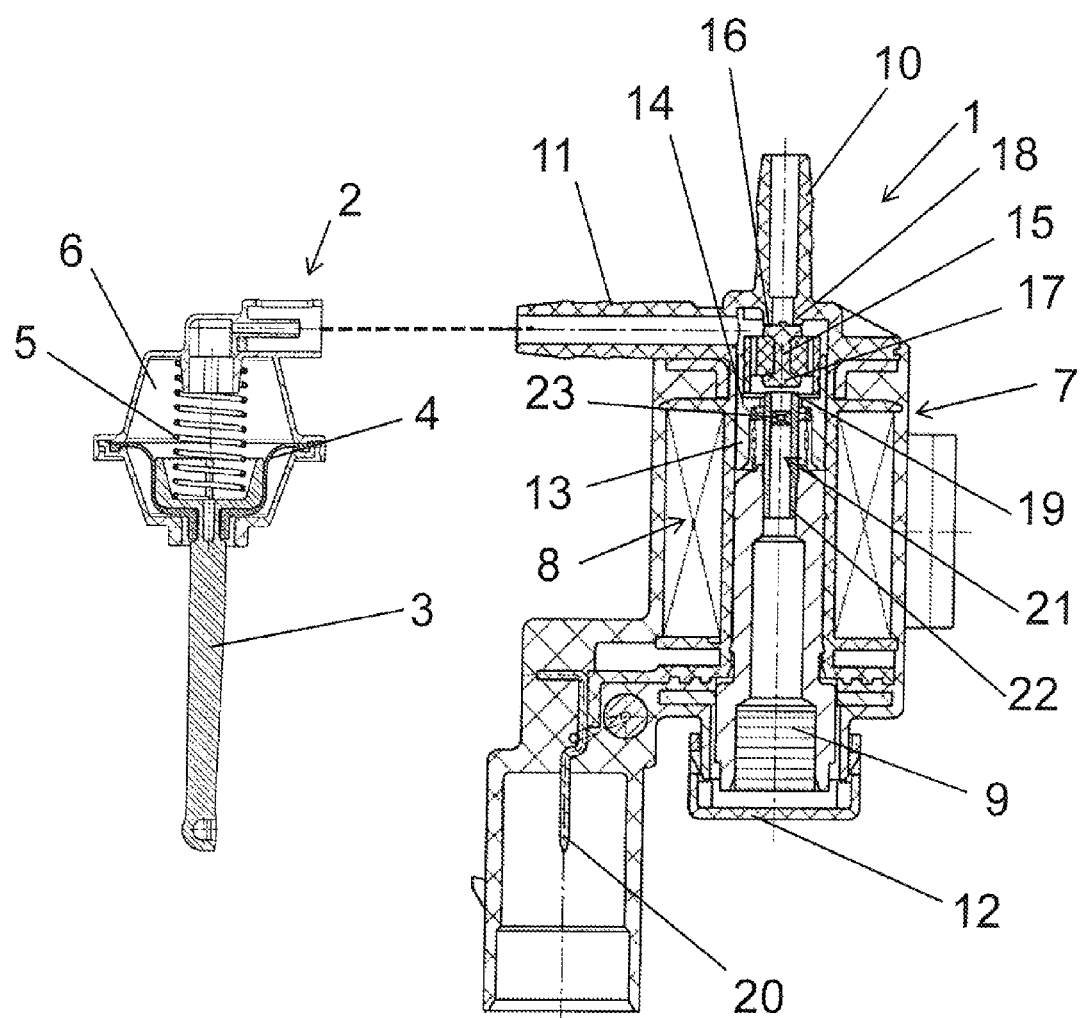

ELECTRICAL SWITCHING VALVE

CROSS REFERENCE TO PRIOR APPLICATIONS

This application is a U.S. National Phase application under 35 U.S.C. §371 of International Application No. PCT/EP2009/051232, filed on Feb. 4, 2009 and which claims benefit to German Patent Application No. 10 2008 019 209.0, filed on Apr. 17, 2008. The International Application was published in German on Oct. 22, 2009 as WO 2009/127450 A1 under PCT Article 21(2).

FIELD

The present invention relates to an electric switching valve, for example, for controlling pneumatic actuator elements, comprising a housing provided with a ventilation connection channel, a vacuum connection channel and a consumer connection channel, wherein an electromagnetic drive is arranged in the housing in such a manner that a magnetic armature is translationally movable in a passage channel and forms a valve closure body for the vacuum connection channel and the ventilation connection channel, with the vacuum connection channel and the ventilation connection channel each comprising a valve seat.

BACKGROUND

An electric switching valve of the above type is described in DE 44 19 875 B4. Such an electric switching valve is particularly suited for driving pneumatic actuators such as vacuum-controlled boxes. These vacuum-controlled boxes in turn drive final control elements on the engine such as, for example, the flaps of suction-tubes, exhaust flaps or the like. In such processes, while the electric switching valve is in the energized state, the actuator of the vacuum-controlled box will perform a stroke movement against a spring force. If the springs are of the strongly-built type, this movement will proceed "slowly" but expeditiously. When the electric switching valve is then switched into the deenergized state, the restoring movement of the vacuum-controlled box is performed solely under the effect of the spring force. In case of strongly-built springs, the restoring movement may occur very rapidly so that, when the flap is operated, a distinctly audible impact of the flap is caused. This hard impact of the flap, apart from the noise generated by it, will also result in increased wear of the flap system.

An extremely place-saving configuration is obtained if the pneumatic actuator element is directly connected to the consumer connection channel in such a manner that the electric switching valve and the pneumatic actuator element together form one constructional unit.

SUMMARY

An aspect of the present invention is to provide an electric switching valve which avoids the above-mentioned disadvantages.

In an embodiment, the present invention provides an electric switching valve for controlling a pneumatic actuator element which includes a housing with a ventilation connection channel, a vacuum connection channel and a consumer connection channel. The vacuum connection channel comprises a first valve seat and the ventilation connection channel comprises a second valve seat. An electromagnetic drive is arranged in the housing. The electromagnetic drive is configured so that a magnetic armature is translationally movable in a passage channel to form a valve closure body for each of the vacuum connection channel and the ventilation connection channel. A cross-sectional constriction device is disposed in the ventilation connection channel.

BRIEF DESCRIPTION OF THE DRAWING

The present invention is described in greater detail below on the basis of embodiments and of the drawing which shows an electric switching valve connected via a schematically illustrated tube connection to a pneumatic actuator element.

DETAILED DESCRIPTION

In an embodiment, the present invention provides a means for cross-sectional constriction in the ventilation connection channel. This ventilation connection channel provides that the air flow during the restoring movement of the pneumatic actuator in the non-energized state of the electric switching valve is restricted, thereby reducing or damping a possible hard impact of the flap.

In an embodiment of the present invention, at least a part of the ventilation connection channel is formed by a tube element, wherein that end of the tube element which is facing away from the ventilation connection forms the valve seat.

It has been found that the means for cross-sectional constriction is suitably provided in the form of a nozzle, an aperture or the like. Under the aspect of production technology, it can be advantageous to design the tube element as a tube nozzle.

The drawing shows an electric switching valve 1 which is connected via a schematically illustrated tube connection to a pneumatic actuator element 2. The pneumatic actuator element 2 substantially comprises a membrane rod 3, provided, for example, for a flap, not shown, which is fastened to a membrane 4 and, by means of a spring 5, is held in a position which in the present case is the extended position. In order to retract the membrane rod 3 against the bias of spring 5, a vacuum should be generated in the chamber 6. This vacuum can be provided by the electric switching valve 1. The electric switching valve 1 comprises a plastic housing 7 accommodating therein an electromagnetic drive 8. The housing 7 is further provided with a ventilation connection channel 9, a vacuum connection channel 10 as well as a consumer connection channel 11. The ventilation connection channel 9 can be covered by a filter element 12. The vacuum connection channel 10 can be connected with a vacuum source, not shown, such as a vacuum pump. The consumer connection channel 11 is connected with the pneumatic actuator element 2 via the tube connection which is only schematically outlined. In a passage channel 13, a magnetic armature 14 is arranged for translational movement. The magnetic armature 14 comprises a valve closure body 15 which has two sealing faces 16 and 17, thus allowing the valve closure body 15 to cooperate with the vacuum connection channel 10 as well as with the ventilation connection channel 9 in such a manner that, either, a vacuum will be generated in the chamber 6 of pneumatic actuator element 2 via consumer connection channel 11, or chamber 6 will be ventilated via consumer connection channel 11. To be able to fulfill this function, vacuum connection channel 10 comprises a valve seat 18, and ventilation connection channel 9 comprises a valve seat 19. Via an electric connection 20, the electric switching valve 1 is connectible to a control unit.

In order to make it possible, during ventilation of chamber 6, to dampen the restoring movement of membrane rod 3 generated by the spring force of spring 5, a means 21 for cross-sectional constriction is provided in ventilation connection channel 9. In the present case, the means comprises a tube nozzle 21 forming both a tube element 22 and a nozzle 23. In this arrangement, the end of tube element 22 facing away from the ventilation connection also forms the valve seat 19. Nozzle 23 provides that, at the moment that the electric switching valve 1 in the present case is switched into the deenergized state and, thus, the valve closure body 15 by its sealing face 16 closes the vacuum connection channel 10 for thereby venting the chamber 6 of the pneumatic actuator element, the air flowing through the ventilation connection channel 9 will be throttled. In this manner, the restoring movement of the membrane rod 3 will be considerably decelerated. An impact speed of a flap to be moved by membrane rod 3 is thereby reduced. This will result in a reduced noise development, but also in reduced wear of the flap and of the flap abutment portion corresponding to the flap.

A further advantage of the present embodiment is that the functions of valve seat 19 and of nozzle element 23 are combined within one constructional component. However, it should be apparent that, in an electric switching valve of the above type, use can also be made of any other variant of a cross-sectional constriction, for example, in the form of an aperture, which is suitable to effect a restriction of the air flow. Further, of course, the nozzle can be arranged in the ventilation channel independently from a tube element.

The present invention is not limited to embodiments described herein; reference should be had to the appended claims.

The invention claimed is:

1. An electric switching valve for controlling a pneumatic actuator element, the electric switching valve comprising:
   an integral housing comprising
      a vacuum connection channel comprising a first valve seat,
      a ventilation connection channel comprising a second valve seat, and
      a consumer connection channel;
      an electromagnetic drive arranged in the housing, the electromagnetic drive being configured so that a magnetic armature is translationally movable in a passage channel arranged between the ventilation connection channel and the vacuum connection channel to form a valve closure body for each of the vacuum connection channel and the ventilation connection channel; and
      a cross-sectional constriction device selected from at least one of a nozzle and an aperture, the cross-sectional constriction being disposed in the ventilation connection channel,
   wherein, the vacuum connection channel, the ventilation connection channel, the electromagnetic drive, the magnetic armature, the passage channel and the valve closure body are each aligned on a same axis,
   wherein, the consumer connection channel is arranged perpendicular to the same axis and is arranged directly next to the vacuum connection channel, and
   wherein, when the electric switching valve is switched into a deenergized state, the ventilation connection channel is in an open position so that air flowing therethrough is throttled by the cross-sectional constriction device.

2. The electric switching valve as recited in claim 1, further comprising a tube element configured to form at least a part of the ventilation connection channel, an end of the tube element facing away from the ventilation connection channel forming the second valve seat.

3. The electric switching valve as recited in claim 2, wherein the tube element is configured as a tube nozzle.

4. The electric switching valve as recited in claim 1, wherein the pneumatic actuator element is connected to the consumer connection channel, the pneumatic actuator element and the consumer connection channel being configured to form one constructional component.

5. Method for controlling at least one pneumatic actuator element using an electric switching valve, the method comprising:
   providing a pneumatic actuator element;
   providing the electric switching valve comprising:
      an integral housing comprising
         a vacuum connection channel comprising a first valve seat,
         a ventilation connection channel comprising a second valve seat, and
         a consumer connection channel,
      an electromagnetic drive arranged in the housing, the electromagnetic drive being configured so that a magnetic armature is translationally movable in a passage channel arranged between the ventilation connection channel and the vacuum connection channel to form a valve closure body for each of the vacuum connection channel and the ventilation connection channel, and
      a cross-sectional constriction device selected from at least one of a nozzle and an aperture, the cross-sectional constriction being disposed in the ventilation connection channel,
   wherein, the vacuum connection channel, the ventilation connection channel, the electromagnetic drive, the magnetic armature, the passage channel and the valve closure body are each aligned on a same axis,
   wherein, the consumer connection channel is arranged perpendicular to the same axis and is arranged directly next to the vacuum connection channel, and
   wherein, when the electric switching valve is switched into a deenergized state, the ventilation connection channel is in an open position so that air flowing therethrough is throttled by the cross-sectional constriction device; and configuring the electric switching valve to control the pneumatic actuator element.

* * * * *